United States Patent [19]
Marchesi et al.

[11] Patent Number: 5,924,771
[45] Date of Patent: Jul. 20, 1999

[54] SEAT, IN PARTICULAR A VEHICLE SEAT FOR PUBLIC PASSENGER TRANSPORT

[75] Inventors: Paolo Marchesi, Asiago, Italy; Lutz Bauch, Dresden; Christian Schoenfelder, Koenigstein, both of Germany

[73] Assignee: Fahrzeugsitze Bad Schandau GmbH, Schandau, Germany

[21] Appl. No.: 08/836,433

[22] PCT Filed: Mar. 16, 1995

[86] PCT No.: PCT/DE95/00371

§ 371 Date: May 9, 1997

§ 102(e) Date: May 9, 1997

[87] PCT Pub. No.: WO96/16833

PCT Pub. Date: Jun. 6, 1996

[30] Foreign Application Priority Data

Nov. 30, 1994 [DE] Germany ............................. 44 42 588

[51] Int. Cl.⁶ ................................. A47C 7/16; B60N 2/24
[52] U.S. Cl. ............................... 297/452.63; 297/440.14; 297/440.15; 297/452.65
[58] Field of Search ................................ 297/391, 411.28, 297/440.1, 440.14, 440.22, 452.55, 452.63, 452.65, 440.2, 440.15

[56] References Cited

U.S. PATENT DOCUMENTS

| | | | |
|---|---|---|---|
| 184,589 | 11/1876 | Childs | 297/452.63 |
| 1,721,601 | 7/1929 | McClure | 297/452.63 X |
| 3,054,156 | 9/1962 | Cohen | 297/400.22 X |
| 3,101,218 | 8/1963 | Baermann . | |
| 3,376,064 | 4/1968 | Jackson | 297/391 |
| 3,482,874 | 12/1969 | Henebry et al. | 297/452.65 |
| 3,797,887 | 3/1974 | Barecki et al. . | |
| 3,848,925 | 11/1974 | Harder, Jr. | 297/452.65 X |
| 3,904,241 | 9/1975 | Makinen | 297/391 |
| 4,580,836 | 4/1986 | Verney | 297/440.22 X |

FOREIGN PATENT DOCUMENTS

| | | |
|---|---|---|
| 0167680 | 1/1986 | European Pat. Off. . |
| 0330594 | 8/1989 | European Pat. Off. . |
| 2306659 | 11/1976 | France . |
| 2807023 | 8/1978 | Germany . |
| 2928852 | 2/1980 | Germany . |
| 3203670 | 8/1983 | Germany . |
| 3328825 | 2/1985 | Germany . |
| 3811939 | 10/1989 | Germany . |
| 4214510 | 11/1993 | Germany . |

*Primary Examiner*—Peter R. Brown
*Attorney, Agent, or Firm*—Jordan and Hamburg LLP

[57] ABSTRACT

A vehicle seat can be produced economically in various sizes and fitted out in various ways suitable for any application by virtue of construction utilizing extruded profiles. A seat module with continuous seating-surface and back-rest segments in a variety of widths is provided. The seat module is self-supporting over the whole width of the seating surface and is made up of two or more hollow shaped-section members running parallel to the front edge of the seating surface. These hollow members have adequate stiffening features in the form of webs and other reinforcements and are partly or completely attached to each other by frictionally locking structure or by the fact that they are integrally jointed to each other. The open sides of the seat module are closed off by coverings and the module supported at one or both sides. Other embodiments are directed to connection of arms and head rests, and the way in which the upholstery is attached.

5 Claims, 4 Drawing Sheets

SEAT, IN PARTICULAR A VEHICLE SEAT FOR PUBLIC PASSENGER TRANSPORT

BACKGROUND OF THE INVENTION

The invention relates to a seat, and more particularly a seat which can be used as a vehicle seat in public transportation.

In designing a vehicle seat for modern rail transport systems, a structure must absorb the relatively high operational stresses which, while presenting minimum mass, provides a high degree of convenience for the passenger. At the same time, it must be capable of being manufactured economically.

Conventional vehicle seats at present are generally characterized by structure comprised of a plurality of components, e.g. an auxiliary frame for receiving components of the seat and backrest and further including armrests and headrests, and a plurality of different coverings.

One such known design discloses a seat constructed by connecting a force-absorbing tubular frame or frame portions of cast metal or of shaped sheet metal with drawn metal shells or laminated plastic components in such a way that the forces which are transmitted to the seat and backrest components via the upholstered portions are transmitted to the support feet and through these into the vehicle structure (DE OS 29 28 852, DE OS 33 28 825, DE OS 28 07 023, DE OS 32 03 670). Further auxiliary frames are conventionally used for attaching the armrests and headrests.

According to another known approach, a seat is formed in such a way that a sandwich shell on an auxiliary frame (DE OS 38 11 939) transmits the forces. Various solutions are also known for attaching the upholstery (DE OS 42 14 510).

A feature common to all these solutions is the large number of different structural members utilized. Due to the design principles normally applied, and to the manufacturing methods resulting therefrom, the members are usually produced as individual parts, i.e. they can be used only to a limited extent in making other seats with differing degrees of comfort. The alignment of individual seats next to one another in order to produce a multiple seat is only possible by means of a subframe. This subframe leads to additional manufacturing work and a limitation of the available space for the passengers' feet. The cleaning of vehicles fitted with such sub-frames is also inconvenient.

SUMMARY OF THE INVENTION

Accordingly, it is an object of the invention to provide a seat of a commonly known design without the aforementioned disadvantages, in particular, a vehicle seat design in which constructional elements can be omitted and which can be manufactured in various dimensions and with various fittings in a universal and economical manner.

The object is achieved in accordance with the invention by a seat comprised of a seat module which is a complete constructional member including seat and backrest segments in variable width dimensions. The seat module includes two or more hollow profile parts extending in a direction parallel to a forward edge of the seat module, the seat and backrest segments each including at least one of such hollow profile parts. The hollow profile parts, which consist of a lightweight material, include webs or reinforcements, and are securably connected together. Open end faces of the hollow profile parts are closed by lateral covers mounted thereto, and the seat module is supported at one or both of the two lateral ends.

In accordance with a feature of the invention, connector members for attachment of said armrests are provided, the connector members comprising wedge-shaped segments, and the hollow profile parts defining cavities in which the wedge-shaped segments are received. The wedge-shaped segments are clamped against interior walls defining the cavities by means of a clamp screw, and the connector members are arranged parallel to the interior walls of the cavities and extend at least partially through the wedge-shaped members.

According to a further feature of the invention, connector members for attachment of headrests are provided, and which comprise a cylindrical tube into which a rectangular-section tube is inserted, the rectangular-section tube accommodating a spring steel blade. The connector member intersects walls of a one of the cavities. The spring steel blade is clamped by means of a clamp screw and a stop to the rectangular-section tube, and the headrest is mountable to the spring steel blade.

In accordance with yet another feature of the invention, constructive members for attachment of upholstered parts are provided. The constructive members are attached to an upholstered support surface and a reinforcing frame with lugs projecting at right angles to a base surface of the upholstered parts. The lugs project inward through slots into the cavities of the hollow profile parts, and are held by rods which are guided on moulded members attached to inner walls of the cavities.

In accordance with embodiment of the invention, the disclosed seat module comprising the vehicle seat, due to its design as a self-supporting hollow member, integrates many individual, previously required conventional components, and is thus capable of accommodating armrests, headrests and hand grips with a minimum number of components.

The seat module forms the basic member for the seating and backrest segment. With respect to economical manufacture, it can be versatilely used for seats with various degrees of comfort in variable dimensions.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
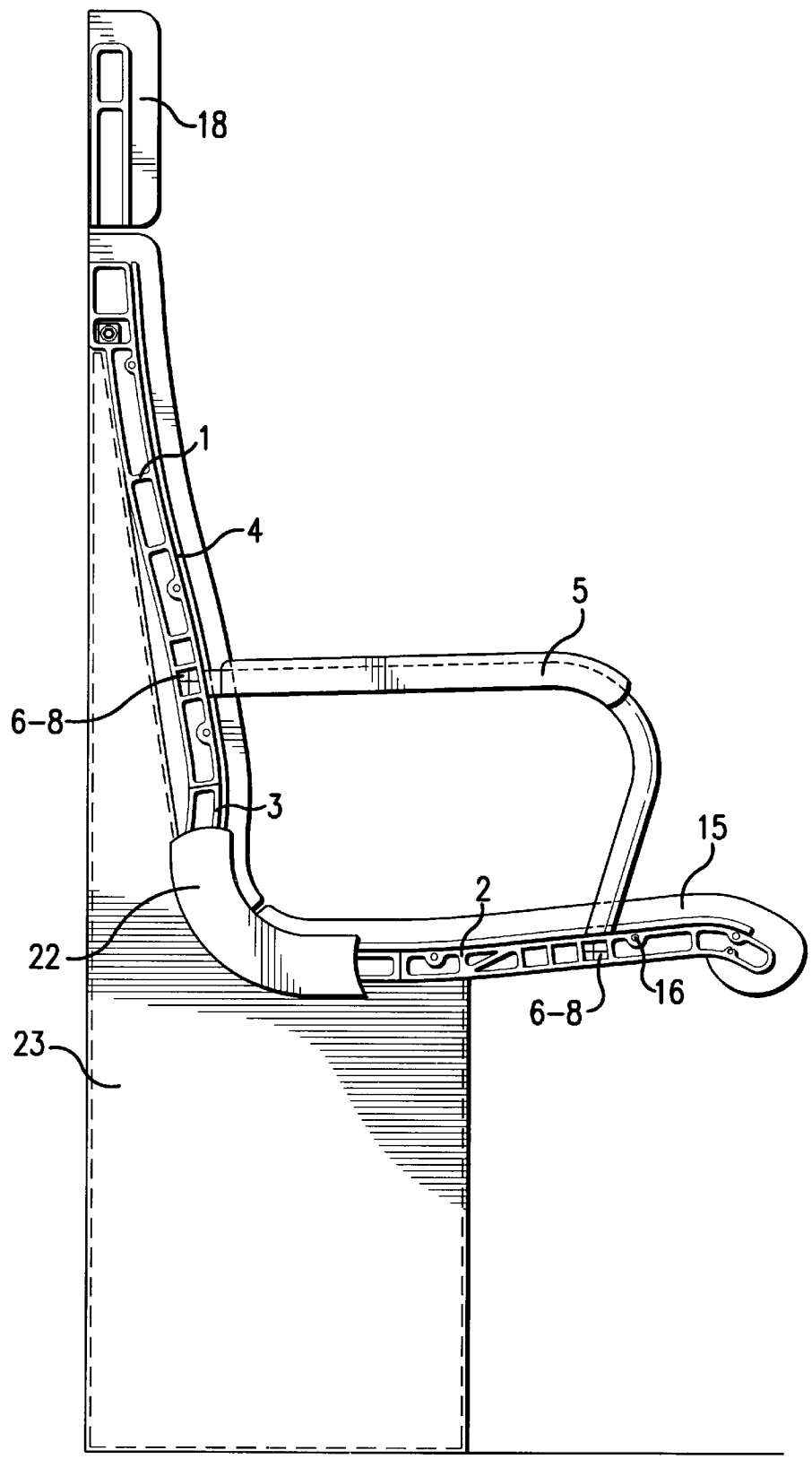
FIG. 1 shows a seat module with integrated secondary frame, carriers for seat and backrest and sub-frame elements in accordance with an embodiment of the invention.

For the load range generally found in the field of railway vehicles, the following description, with reference to an embodiment given by way of an example, describes a vehicle seat which can be used as a double seat for installation in first class, whose seat module 1, of applicable dimensions, is used without additional auxiliary frames or support members except for two lateral supports 23 (seat support feet).

The strength values according to which the seat module 1 is designed are selected in such a way that seats with less seating width, i.e. a smaller support width of the seat module, are included. Regarding the stress load, the solution illustrated shows the scale of measurements typically required in equipment used in railway vehicles. In addition, parts of the seat module 1 can be used as basic members for individual seats with different degrees of comfort, in which only the shape of the upholstered portion is varied.

Use of extrusion profiles depicted as various seat segments 2, 3 and 4, permits production of virtually any optional width size within the aforementioned scale of measurements.

The previously required manufacture of various non-interchangeable members to produce various seating widths is eliminated.

The described profiles of seat segments 2, 3 and 4, when connected together, form an enclosed seat module 1. The resultant design enables connection of seat module 1 to the vehicle structure with a minimum number of additional frame members. In particular, constructional elements which are used for mounting seat and backrest segments may be omitted.

The shaping of seat module 1 in its cross section is determined by the ergonomically necessary profile for a vehicle seat in accordance with currently accepted parameters. Various heights of backrest and various seat depths are produced by the insertion of intermediate profiled parts.

The hollow profiles of seat segments 2, 3 and 4 are disposed in the longitudinal direction of seat module 1, i.e. parallel to the front edge of the seat, in order to ensure rigid structure as individual carriers which are connected together in a positive, nonpositive, or materially-engaged manner. Such longitudinal arrangement enables a greater span between support members. The internal structure of the hollow profiles is formed in accordance with strength requirements, particularly in such a way that the shearing stresses occurring in the cross section due to bending stresses are reliably limited in both stress directions. The aggregate of the hollow profiles of seat segments 2, 3 and 4, which are assembled in the form indicated above, define a three-dimensional shell structure which is capable of transmitting the occurring stresses to support members 23. The bridging of a support span required for a multiple seat is also ensured by means of this arrangement. In particular, the transverse supports for receiving the seat module which were generally necessary in previously known seat arrangements can now be omitted. The open end faces of seat segments 2, 3 and 4 are closed by lateral covers 22, attachment of which is undertaken in the interior of the cavity profiles thereof.

In order to produce larger overall seat widths, seating module 1 can be supported at any optional point. Due to the internal structure, seat module 1 requires no specific attachment zones.

Figure 2:
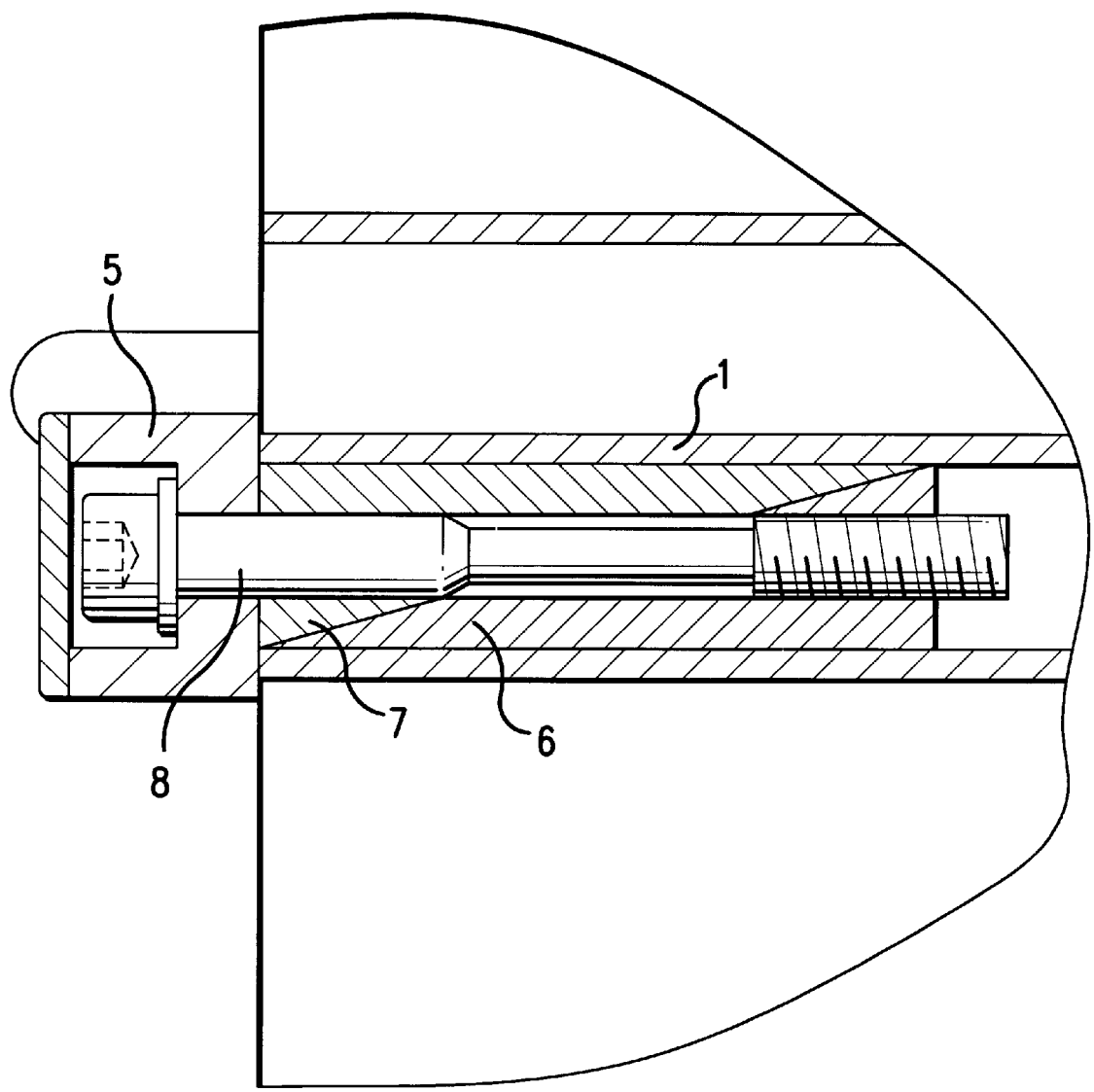
FIG. 2 shows an attachment of armrests.

The hollow cavities of seat segments 2, 3 and 4 also offer an opportunity for attaching accessory parts such as armrests, headrest and hand grips. Basically, two variants are distinguished according to the invention. In a first variant, connector elements are disposed parallel to the hollow cavity webs of seat segments 2, 3 and 4 (FIG. 2). In a second variant the hollow cavity webs of seat segments 2, 3 and 4 are intersected by the connector members (FIG. 3).

In variant 1, which is used to attach armrests 5 (FIG. 2), connector members are incorporated parallel to the hollow cavity walls of seat segments 2, 3 and 4. In the cross-section of seat module 1, hollow cavities are produced during manufacture in various hollow cavity profiles, whose dimensions coincide with those of full profiles. The connector members are comprised of two wedge-shaped segments 6 and 7, which are clamped by means of a clamp screw 8 against the interior of the hollow cavity webs. In this way the position of armrest 5 is clearly fixed. By means of varying the longitudinal dimensions of wedge-shaped segments 6 and 7, the proposed solution represents a method of producing the initiation of force via a surface selected in accordance with the stress. In this way the previously necessary secondary frame can be omitted, as the seating module is used directly for absorbing forces.

Figure 3:
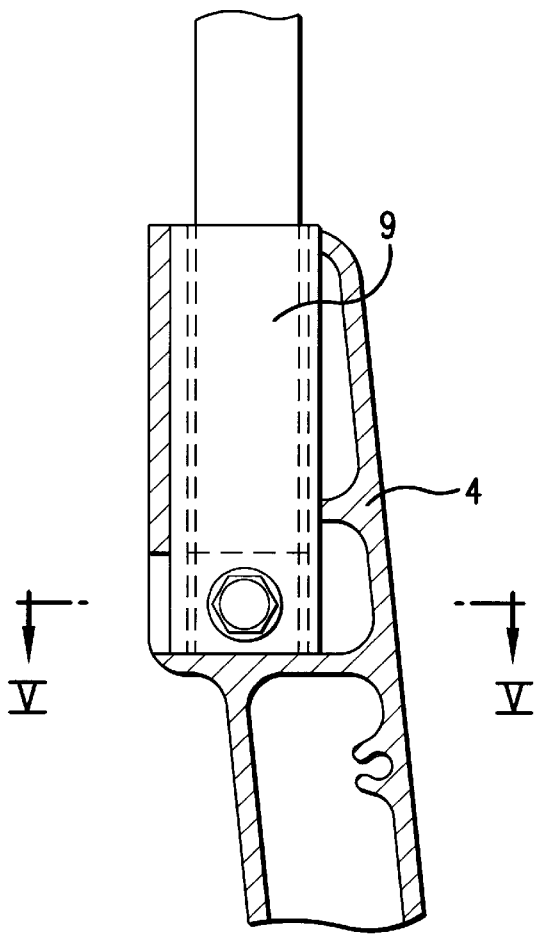
FIG. 3 shows an attachment for headrest or hand grip.
Figure 5:
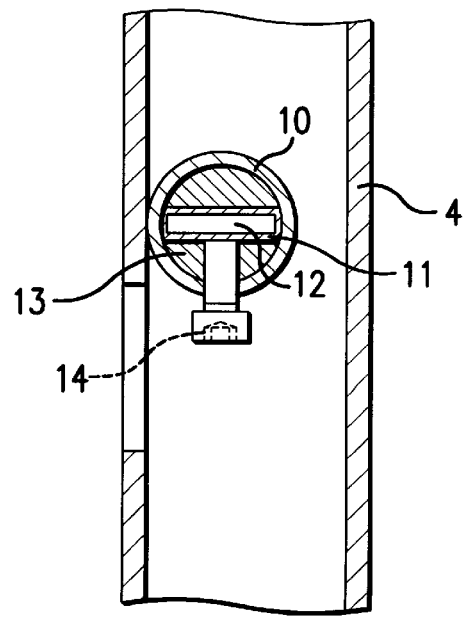
FIG. 5 is a cross section taken on section line V—V of FIG. 3.

Variant 2 represents the method of attaching a headrest 18 or a hand grip (not shown) on the seat module (FIGS. 3 and 5). In this case connector members intersect with the hollow cavity webs. A connector member 9 consists of a cylindrical sleeve 10, in which a rectangular-section tube 11 is inserted in a positively engaging manner and/or in a materially-engaged manner by gluing. Inserted into this rectangular-section tube 11 is a flat bar 12 of spring steel, which is attached to the accessory member, in the present case headrest 18. The locking of flat bar 12 is ensured by clamping in rectangular-section tube 11 by means of clamp screws 13 and a stop 14. Cylindrical sleeve 10 distributes the forces to be absorbed over a plurality of cavity webs. The cylindrical cross section of connector member 9 ensures economic production of the apertures in the cavity walls.

Figure 4:
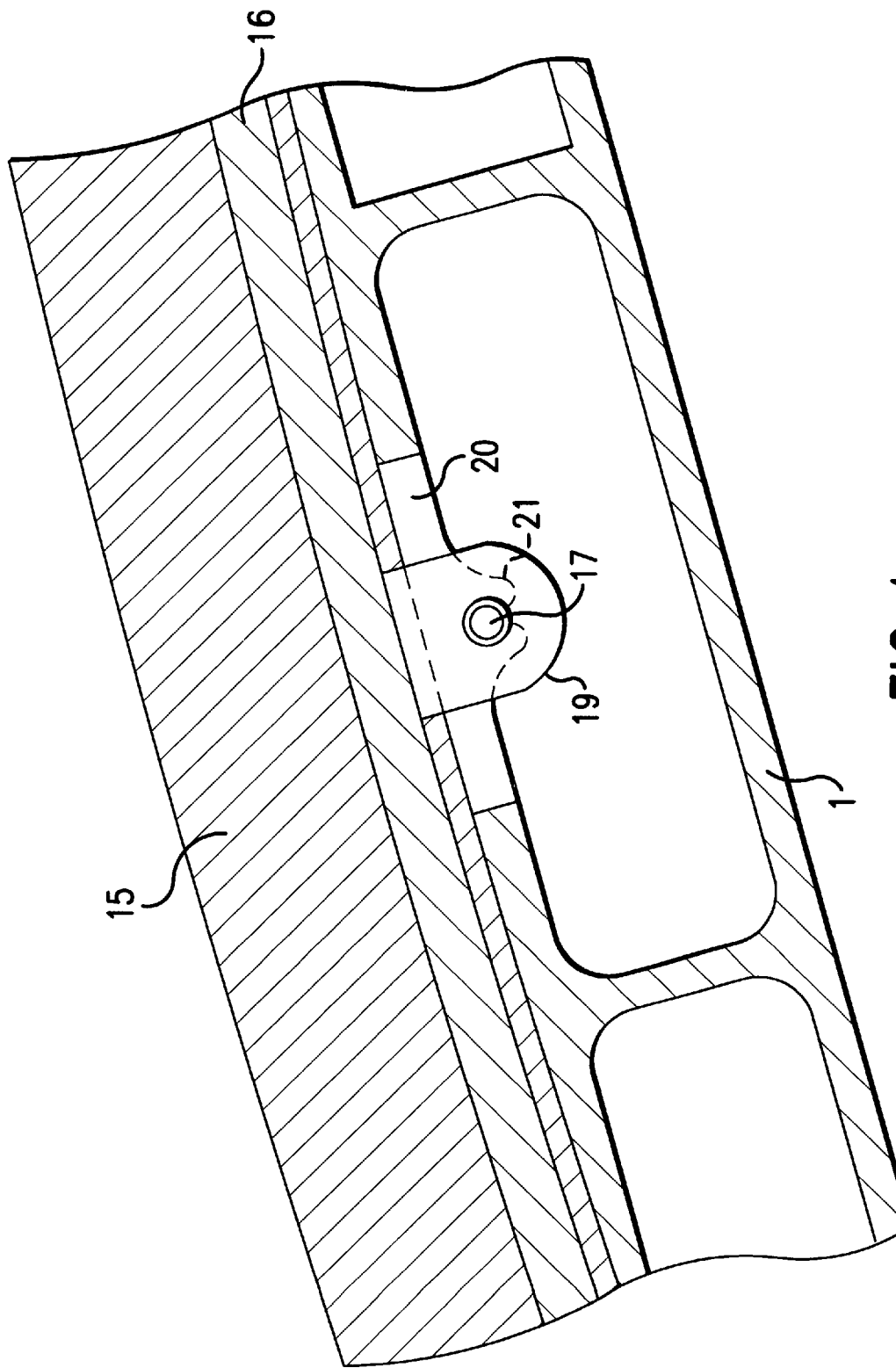
FIG. 4 shows an attachment of upholstered portions.

FIG. 4 describes the attachment of the upholstered portions on seat module 1. Surrounding reinforcements 16 are built into the upholstered member 15 of the seat or of the seat segments 2, 3 and 4. Reinforcements 16 include lugs 19 that project at right angles from the underside of the upholstery, lugs 19 including bores formed therein positioned to extend beyond the upholstery contour. Lugs 19 engage slots located in the upholstery support surface 15 of the seat module. Aligned slots 20 are formed through the walls of cavity profiles to receive lugs 19 therethrough. The cavity profiles also define moulded elements 21 located on their inner sides, for the insertion of attachment rods 17. These inserted attachment rods 17 lock lugs 19 of upholstery reinforcement 16 within the hollow cavity profiles. The hollow cavities are finally closed by lateral covers 22 (FIG. 1) on their end faces, so that the attachment members are not easily accessible. The proposed solution thus replaces a plurality of attachment members for affixing upholstery which are accessible from the exterior. It is further noted that additional supports 23 may be provided if so desired (FIG. 1).

We claim:

1. A seat, in particular a vehicle seat for public passenger transport, comprising a seat module;

said seat module being a complete constructional member including seat and backrest segments in variable width dimensions, connected together in fixed abutted engagement, said backrest segment extending upward from said seat segment a sufficient height for supporting at least a portion of a back of a seated individual and for providing longitudinal reinforcement against bending stresses, said seat module including two or more hollow profile parts, each hollow part defined by integrally formed upper, lower and side walls surrounding an interior space, said seat and backrest segments each including at least one of said hollow profile parts, said hollow profile parts extending in a direction parallel to a forward edge of said seat module, said hollow profile parts including one of webs and reinforcements integrally formed internal thereof for providing supplemental rigidity against shearing stresses, said hollow profile parts being securably connected together at least partly, said hollow profile parts being comprised of a lightweight material, open end faces of said hollow profile parts of said seat module being closed by lateral covers mounted thereto; and said seat module being supported at at least one lateral end.

2. A seat as claimed in claim 1, said seat module having a greater support width, wherein said seat module is provided with additional supports disposed along said support width.

3. A seat, in particular a vehicle seat for public passenger transport, comprising:

a seat module;

said seat module being a complete constructional member including seat and backrest segments connected together, and armrests and headrests, in variable width dimensions, said seat module including two or more hollow profile parts, said seat and backrest segments each including at least one of said hollow profile parts, said hollow profile parts extending in a direction parallel to a forward edge of said seat module, said hollow profile parts including webs and reinforcements, said hollow profile parts being at least partially securably connected together, said hollow profile parts being comprised of one of lightweight metal alloys and plastics, open end faces of said hollow profile parts of said seat module being closed by lateral covers mounted thereto;

said seat module being supported at at least one lateral end; and connector members for attachment of said armrests, said connector members comprising wedge-shaped segments, said hollow profile parts defining cavities therein within which said wedge-shaped segments are received, said wedge-shaped segments being clamped against interior walls defining said cavities by means of a clamp screw, said connector members being arranged parallel to said interior walls of said cavities and extending at least partially through said wedge-shaped members.

4. A seat, in particular a vehicle seat for public passenger transport, comprising:

a seat module;

said seat module being a complete constructional member including seat and backrest segments connected together, and armrests and headrests, in variable width dimensions, said seat module including two or more hollow profile parts, said seat and backrest segments each including at least one of said hollow profile parts, said hollow profile parts extending in a direction parallel to a forward edge of said seat module, said hollow profile parts including webs and reinforcements, said hollow profile parts being at least partially securably connected together, said hollow profile parts being comprised of one of lightweight metal alloys and plastics, open end faces of said hollow profile parts of said seat module being closed by lateral covers mounted thereto;

said seat module being supported at at least one lateral end; and connector members for attachment of said headrests, said hollow profile parts defining cavities therein, said connector member comprising a cylindrical tube into which a rectangular-section tube is inserted, said rectangular-section tube accommodating a spring steel blade, said connector member intersecting walls of a one of said cavities, said spring steel blade being clamped by means of a clamp screw and a stop to said rectangular-section tube, said headrest being mounted to said spring steel blade.

5. A seat, in particular a vehicle seat for public passenger transport, comprising:

a seat module;

said seat module being a complete constructional member including seat and backrest segments connected together, and armrests and headrests, in variable width dimensions, said seat module including two or more hollow profile parts, said seat and backrest segments each including at least one of said hollow profile parts, said hollow profile parts extending in a direction parallel to a forward edge of said seat module, said hollow profile parts including webs and reinforcements, said hollow profile parts being at least partially securably connected together, said hollow profile parts being comprised of one of lightweight metal alloys and plastics, open end faces of said hollow profile parts of said seat module being closed by lateral covers mounted thereto;

said seat module being supported at at least one lateral end; and constructive members for attachment of upholstered parts, said constructive members being attached to an upholstered support surface and a reinforcing frame with lugs projecting at right angles to a base surface of said upholstered parts, said hollow profile parts defining cavities therein, said lugs projecting inward through slots into said cavities, said lugs being held by rods which are guided on moulded members attached to inner walls of said cavities, said rods being covered by said lateral covers.

* * * * *